United States Patent [19]

Stanishewski

[11] Patent Number: 5,187,891

[45] Date of Patent: Feb. 23, 1993

[54] STILL FISHING ROD STAND AND EASY RELEASE LATCH AND STOP PLATE

[76] Inventor: Joseph F. Stanishewski, R.D. #1, Box 303D, Millmont, Pa. 17845

[21] Appl. No.: 806,012

[22] Filed: Dec. 9, 1991

[51] Int. Cl.⁵ .............................................. A01K 97/10
[52] U.S. Cl. ...................................... 43/21.2; 248/533
[58] Field of Search ................... 43/21.1; 248/530, 533

[56] References Cited

U.S. PATENT DOCUMENTS

| | | | |
|---|---|---|---|
| 2,492,323 | 12/1949 | Poell | 248/533 |
| 2,506,912 | 5/1950 | Augustine | 43/21.2 |
| 2,839,865 | 6/1958 | Lubanski | 43/21.2 |
| 3,309,808 | 3/1967 | George, Sr. | 248/533 |
| 3,858,833 | 1/1975 | Fink | 248/533 |
| 4,938,446 | 7/1990 | Williams | 43/21.2 |
| 4,972,621 | 11/1990 | Tucker | 43/21.2 |
| 5,058,308 | 10/1991 | Girard | 43/21.1 |

FOREIGN PATENT DOCUMENTS

| | | | |
|---|---|---|---|
| 2639352 | 3/1978 | Fed. Rep. of Germany | 43/21.2 |
| 2533414 | 3/1984 | France | 43/21.2 |
| 8300363 | 8/1984 | Netherlands | 43/21.2 |
| 2056232 | 3/1981 | United Kingdom | 43/21.2 |
| 2129261 | 5/1984 | United Kingdom | 43/21.2 |
| 2181932 | 5/1987 | United Kingdom | 43/21.2 |

Primary Examiner—Kurt C. Rowan
Attorney, Agent, or Firm—Thomas E. Sterling

[57] ABSTRACT

A fishing rod stand adapted to be positioned adjacent to fishing water having a V-shaped configuration on one end attached to an upper rod section coupled to a movable connecting sleeve. A lower rod section member fits into the connecting sleeve and has a point on one section thereof for penetrating the ground. A bar member is attached to the lower end section adapted for foot pressure to press the fishing rod stand into the ground. Three embodiments of this invention are presented: (1) one with a foot pressing bar, (2) one with a novel latching member coupled to the V-shaped member to secure the fishing rod, and (3) the third with a stop plate member slidably positioned on the lower rod section to steady the fishing rod stand when it is pressed into the ground. Embodiment (3) may be combined with either embodiment (1) or (2).

15 Claims, 2 Drawing Sheets

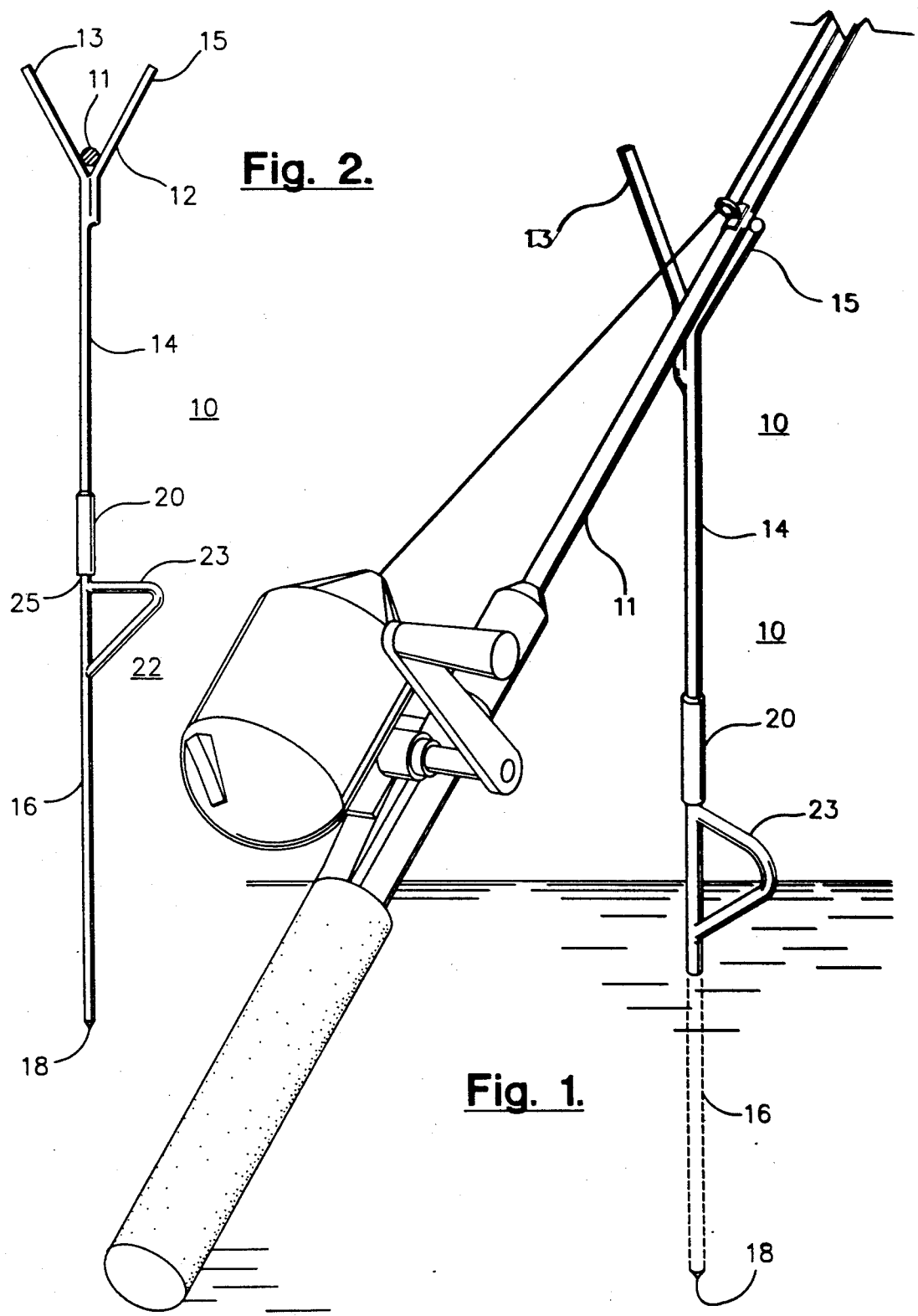

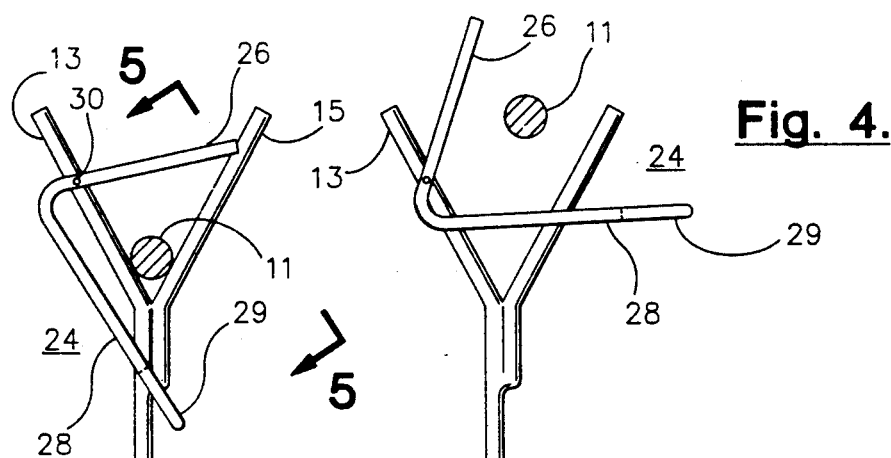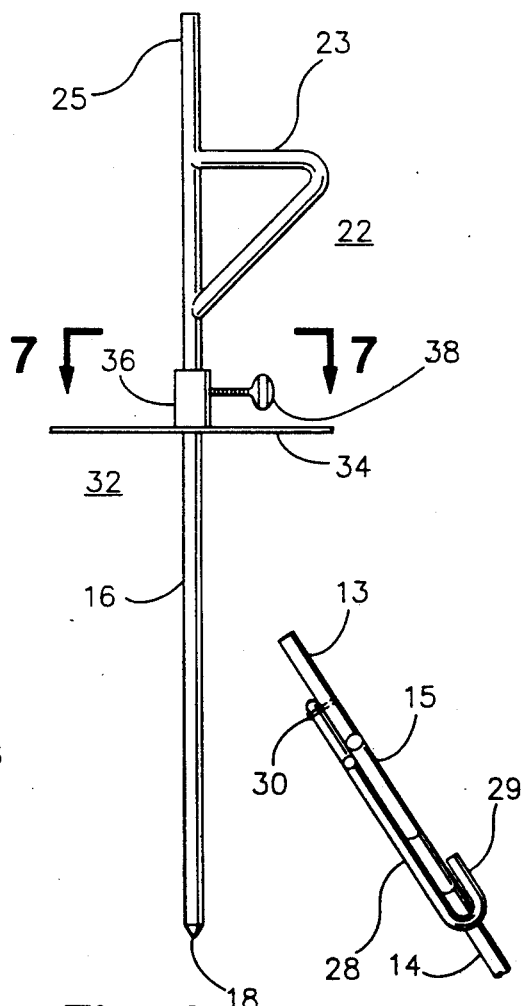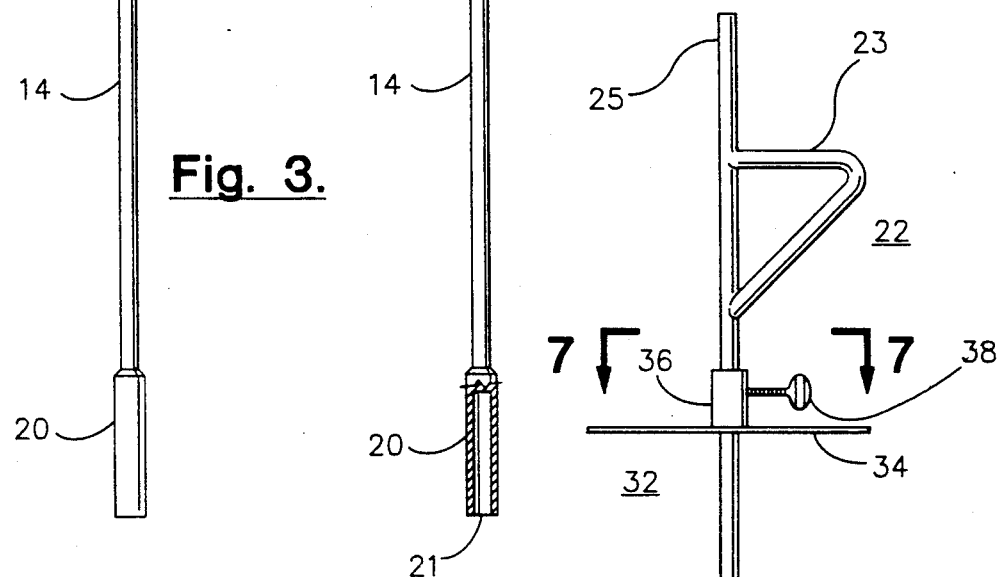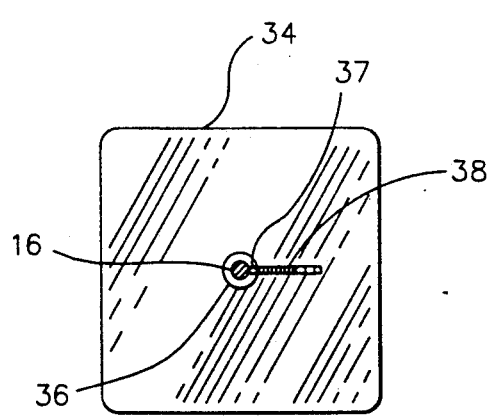

STILL FISHING ROD STAND AND EASY RELEASE LATCH AND STOP PLATE

This invention relates to fishing rod stands, and in particular to fishing rod stands which support the fishing rod at or near the bank or body of water.

PRIOR ART STATEMENT

There are a number of prior structures of this type providing holders for fishing rods to be used at or near the bank or body of water. Prior structures which our patent search revealed to be the closest to the invention are found in U.S. Pat. No. 3,858,833 and 4,479,628. None however have all the characteristics of the present invention.

SUMMARY OF THE INVENTION

This invention is a novel fishing rod stand adapted to be positioned near a body of water and to support a fishing rod while it is being used to fish. This invention was intended for fishermen who primarily like to fish along the bank or beaches using one or more fishing rods and who wish their rod to be supported while they wait. The fishing rod stand allows the fisherman to relax better knowing that his fishing gear is not lying on the rocks, in the mud or sand getting ruined, or being towed away from some hard hitting fish who decides to take off after being hooked. The stand features more durability than a stick or tree branch which can or does break off. It is in two or more sections as desired and it is made of stainless steel or other durable material which will not rust or corrode.

The fishing rod stand which is the subject of this invention comprises three novel embodiments. The first embodiment has a foot bar member allowing the foot to press the stand into the ground. The second embodiment features a novel latch mechanism positioned upon the V-shaped member and capable of retaining the fishing rod in the event that it is jerked violently by a striking fish. The third embodiment involves a stop plate adjustably positioned on the lower section of the rod which will prevent the rod from penetrating the ground beyond a predetermined depth or to rest on the ground. It maintains the rod in a vertical position in loose earth.

OBJECTS

It is an object of this invention to provide a foot bar attached to the fishing rod stand for the purpose of providing foot pressure to force the stand into the earth.

It is another object of this invention to provide a unique latching mechanism which will retain the fishing rod within the fishing rod stand even when jerked or violently moved as by striking fish.

Still another object of this invention is to provide a stop plate mechanism which will adjust the penetration into the earth of the fishing rod stand and hold the stand vertically even in loose earth.

It is another object of this invention to provide a fishing rod stand which rests on the surface of the ground without penetration.

It is another object of this invention to provide an easily carried and stored fishing rod stand that can be transported in a conventional tackle box.

It is another object of this invention to provide a fishing rod stand which will support a fishing rod during use keeping the rod and reel from the rocks and sand where they may be damaged.

It is still another object of this invention to provide a stand upon which can be fastened a stringer having fish leaving the fish in the water to keep them alive.

It is another object of this invention to provide a fishing rod stand the height of which can be adjusted by inserted sections.

It is yet another object of this invention to provide a fishing rod stand which resists rust or corrosion when exposed to water environment or the damp environment of a tackle box.

It is still another object of this invention to provide a fishing rod stand with a rotatable coupling sleeve which will allow the upper portion of the stand to easily rotate to conform to the positioning of the fishing rod.

It is still another object of this invention to provide a fishing rod stand upon which an adjustable stop plate and an easy release latch mechanism may be installed.

These and other objects of the invention may be seen by referring to the drawings and specification as follows:

DESCRIPTION OF THE DRAWINGS

FIG. 1 is a diagrammatic perspective view of the fishing rod stand, positioned in ground adjacent to the body of water and holding a fishing rod;

FIG. 2 is a perspective view of the fishing rod stand of FIG. 1;

FIG. 3 is a perspective view of the upper portion of a second embodiment of the invention, having a latch member installed therein in locked position and a cross sectional view of the fishing rod;

FIG. 4 is a perspective view of the upper portion of a second embodiment of the invention, having the latching member pivoted and in an open or unlatched position with a cross sectional view of the fishing rod and showing a sectional view of the coupling sleeve;

FIG. 5 is a view taken along lines 5—5 of FIG. 3;

FIG. 6 is a perspective view of the lower portion of the fishing rod stand showing the stop plate member clamped to the lower rod section;

FIG. 7 is a view taken along lines 7—7 of FIG. 6, showing the stop plate member, sliding sleeve and locking sleeve.

Referring to the drawings and in particular to FIG. 1 (the first embodiment of the invention) shows the fishing rod stand 10 positioned in the ground and holding a fishing rod 11. In FIG. 2, 10 represents the first embodiment of the invention, the fishing rod stand in an upright position. The fishing rod stand 10 is generally comprised of a V-shaped member 12 with two upwardly extending intersecting arms 13 and 15. V-shaped member 12 may also be U-shaped, rectangular, curved or other shape that will contain the fishing rod 11 within its confines. An upper rod section 14 is attached to the intersecting apex of the arms 13 and 15 and extends downward therefrom. The lower portion of upper rod section 14 is attached to a coupling sleeve 20 which is slip coupled to a lower rod section 16. A fishing rod 11 is shown positioned between the arms 13 and 15.

Coupling sleeve 20 (FIGS. 2 and 4) is comprised of a hollow tube secured to the lower portion of upper rod section 14, usually be welding, and extends downwardly therefrom. A lower rod receiving hole 21 extends downwardly through coupling sleeve 20 and is adapted to receive the end portion 25 of the lower rod section 16 in a loose slip fit. The end portion 25 of lower rod section 16 is inserted in lower rod receiving hole 21 in a slip fit manner so that the rod section 14 can rotate within lower rod receiving hole 21. Thus the V-shaped member 12 can rotate to accommodate various positions of fishing rod 11. The lower end portion of lower rod section 16 has a point 18 thereon allowing it to be pressed into the ground with greater ease.

A foot pressing bar 22 is attached to the upper portion of lower rod section 16 so that one arm section 23 is approximately horizontal, to facilitate ease in applying foot pressure. The arm section 23 is designed to be stepped on by a foot to press the lower rod section 16 into the ground. It should be noted that lower rod section 16, foot pressing bar 22, end portion 25 and point 18 are also used in the second embodiment of this invention shown in FIGS. 3, 4 and 5 and the third embodiment shown in FIGS. 6 and 7.

Referring now to FIGS. 3, 4 and 5, there is shown a second embodiment of the device in which arm 13 has a latching member 24 pivotally attached thereto. Latching member 24 is comprised of a cross bar 26 extending between the arm 13 and arm 15 in its latch position. A descending rod section 28 has a U-shaped end portion 29 thereon. U-shaped end portion 29 of descending rod 28 locks on rod section 14 (see FIG. 5). Latch member 24 is thus securely held in locked position. A latch pivot pin 30 extending through cross bar 26 and arm 13 allows the latch member 24 to pivot thereon with a vertical motion. Latch pivot pin 30 may be a cotter pin, rivet, bolt or other pivot mechanism. The latched position of latch member 24 is shown in FIG. 3 and the open position in FIG. 4. In the closed position (FIG. 3), descending rod 28 is pivoted downwardly about latch pivot pin 30 so that U-shaped end portion 29 locks on rod section 14. Fishing rod 11 is held between arms 13 and 15 and can not be jarred out of its locked position. Latch member 24 may be opened by rotating it about latch pivot pin 30 (FIG. 4) allowing fishing rod 11 to be easily removed. Latch member 24 may be pivoted on latch pivot pin 30 until the U-shaped section of descending rod section 28 couples with upper rod section 14. Cross bar 26 then extends between arms 13 and 15. If rod 11 is positioned between arms 13 and 15 it is locked into position and will not release fishing rod 11.

The third embodiment of the invention can be seen with reference to FIGS. 6 and 7 and is comprised of the stop plate member 32. Stop plate member 32 is a device which may be slidably clamped upon lower rod section 16 in any selected position and is designed to prevent lower rod section 16 from penetrating the ground further than stop plate member 32. Stop plate member 32 is comprised of a square stop plate 34 upon which is attached a hollow sleeve 36 through which is inserted lower rod section 16 to form a sliding fit. Lower rod section 16 thus extends through sleeve 36 and stop plate 34. Sleeve 36 has a threaded hole 37 therethrough in which is screwed a threaded thumb screw 38 adapted to bear against lower rod section 16 and anchor stop plate member 32 in position. It should be noted that stop plate member 32 now can be slid up and down upper rod section 14 and locked into position by turning thumb screw 38 to bear against lower rod section 16. Stop plate member 32 thus allows the penetration into the soil of lower rod section 16 to be controlled. When stop plate 34 is flush with the ground it steadies the fishing rod stand 10 by not allowing it to tilt as it might do in loose earth. Stop plate 34 may be positioned at point 18 allowing no ground penetration. The device is then used as a nonpenetrating fishing rod stand.

Embodiment 1 and embodiment 2 utilize identical lower rod section 16, pressing bar 22, upper rod section 14, and arms 13 and 15. Stop plate member 32 may be installed on embodiment 1 or 2. Hence the embodiments are interchangeable with each other and may be utilized by the fisherman depending upon the circumstances and conditions of fishing.

In operation, the fishing rod stand, embodiment 1 or embodiment 2 is driven into the ground near the water's edge by pushing the foot on the foot pressing bar 22 as is depicted in FIG. 1. If the fishing rod stand 10 is utilized, fishing rod 11 is placed between arms 13 and 15 and the base of fishing rod 11 laid on the ground. The fishing rod 11 is thus supported so that the attention of the fisherman does not have to be continuously maintained. When a fish bites, the bending of the rod and clatter will call the fisherman's attention and he may return and retrieve the rod and to land the fish.

If the second embodiment of FIGS. 3, 4 and 5 is utilized latch member 24 is then rotated about latch pivot pin 30 until the fishing rod 11 can be inserted between arms 13 and 15 (FIG. 4). Latch member 24 is then rerotated about latch pivot pin 30 in a downward direction until the U-shape of descending rod 28 clamps upon lower rod section 16 and cross bar 26 extends between arms 13 and 15. The fishing rod 11 is then clamped between the arms 13 and 15 and cross bar 26. Should a fish strike the line connected to fishing rod 11 and causes it to be jarred upward, it would be kept between the arms 13 and 15 by the clamping action of cross bar 26.

The third embodiment of this invention (set forth in FIGS. 6 and 7) is best used when the ground is loose as with sandy or muddy soil. In use the stop plate member 32 is clamped into predetermined position by means of locking screw 38. Lower rod section 16 is then driven into the ground with foot pressure on foot pressing bar 22. The depth of penetration into the ground can be adjusted to the ground conditions. Shallow soil requires minimum penetration before the plate 34 rests on the ground surface. If no penetration is possible the stop plate can be set at the end portion of lower rod section 16 and act as a nonpenetrating stand. When the stop plate 34 reaches the surface of the ground it will support the fishing rod stand preventing it from tilting. It should be noted that any of the three embodiments of these variations heretofore described may be utilized by the fisherman depending upon the circumstances and terrain where he is fishing. The height of the fishing rod stand can be varied by installing additional sections (not shown) between coupling sleeve 20 and lower rod section 16.

Stop plate member 32 may be used with either the first embodiment of this invention, FIGS. 1 and 2, or the second embodiment, FIGS. 3, 4 and 5. All embodiments are coupled to and utilize lower rod section 16.

This invention has been described with a certain degree or particularity. However, it is contemplated that various changes and modifications and design may be made therein without departing from the spirit of the invention.

I claim:

1. A fishing rod stand, comprising in combination:
   a shaped member comprised of two arms intersecting at an apex;
   upper rod section, one end of which is attached to said shaped member at the apex thereof;

coupling sleeve attached to the other end portion of said upper rod section, said coupling sleeve having a rod receiving opening therein;

a lower rod section having a point on one end thereof, the other end portion of said lower rod section positioned within said rod receiving opening;

a foot bar member, attached to said lower rod section and extending outwardly therefrom;

a latch member pivotally connected to said shaped member;

a cross bar member, pivotally attached to one of said arms and extending to the other of said arms;

a descending member attached to said cross bar member having a shaped end section thereon adapted to clamp upon said upper rod section.

2. The combination of claimed in claim 1, having a stop plate member slidably positioned on said lower rod section, said stop plate member comprising in combination:

a plate;

a plate sleeve attached to said plate, having an opening therethrough, through which said lower rod section extends;

clamping means attached to said plate sleeve adapted to bear against said lower rod section in a clamping relationship.

3. The combination as claimed in claim 2, in which said clamping means is comprised of, in combination:
screw threads extending through said plate sleeve;
thumb screw in threaded relationship with said screw threads, said thumb screw adapted to bear against said lower rod member in a clamping relationship.

4. The combination as claimed in claim 3, in which the end part of said lower rod section is positioned within said rod receiving opening to form a rotatable fit.

5. The combination as claimed in claim 4, in which said pivotal attachment is comprised of, in combination:
a cotter pin extending through said cross bar member and one of said arms.

6. The combination as claimed in claim 5, in which said shaped member is a V-shaped member.

7. The combination as claimed in claim 6, in which said fishing rod stand is made of corrosion resistant material.

8. The combination as claimed in claim 7, in which said corrosion resistant material is stainless steel.

9. The combination as claimed in claim 6, in which a segment of said foot bar member is horizontal.

10. The combination as claimed in claim 9, in which said foot bar member is attached to said lower rod section at two points.

11. The combination as claimed in claim 1, in which the end part of said lower rod section is positioned within said rod receiving opening to form a rotatable fit.

12. The combination as claimed in claim 11, in which said pivotal attachment is comprised of, in combination:
a cotter pin extending through said cross bar member and one of said arms.

13. The combination as claimed in claim 12, in which a segment of said foot bar member is horizontal.

14. The combination as claimed in claim 13, in which said foot bar member is attached to said lower rod section at two points.

15. The combination as claimed in claim 14, in which said fishing rod stand is made of stainless steel.

* * * * *